UNITED STATES PATENT OFFICE.

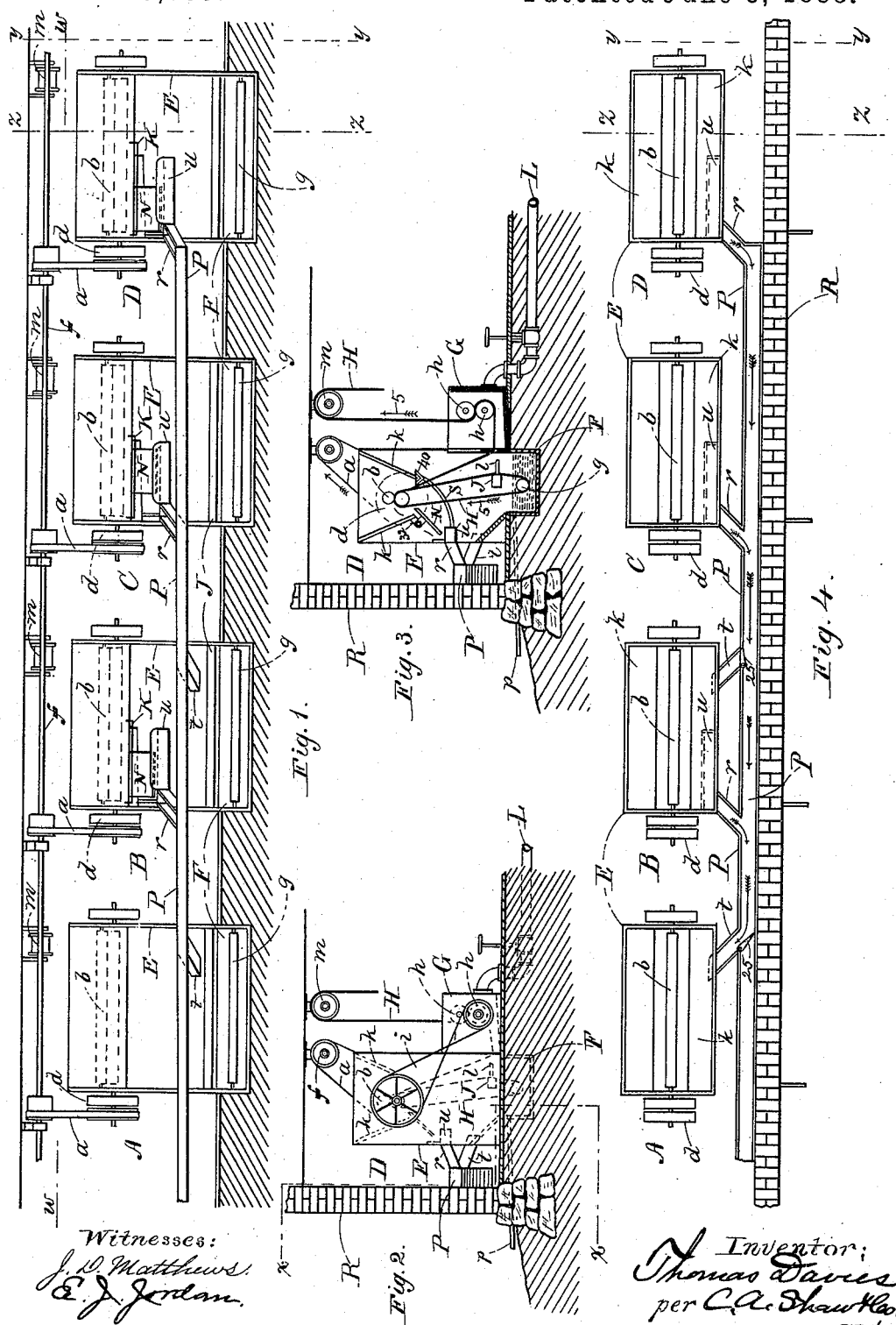

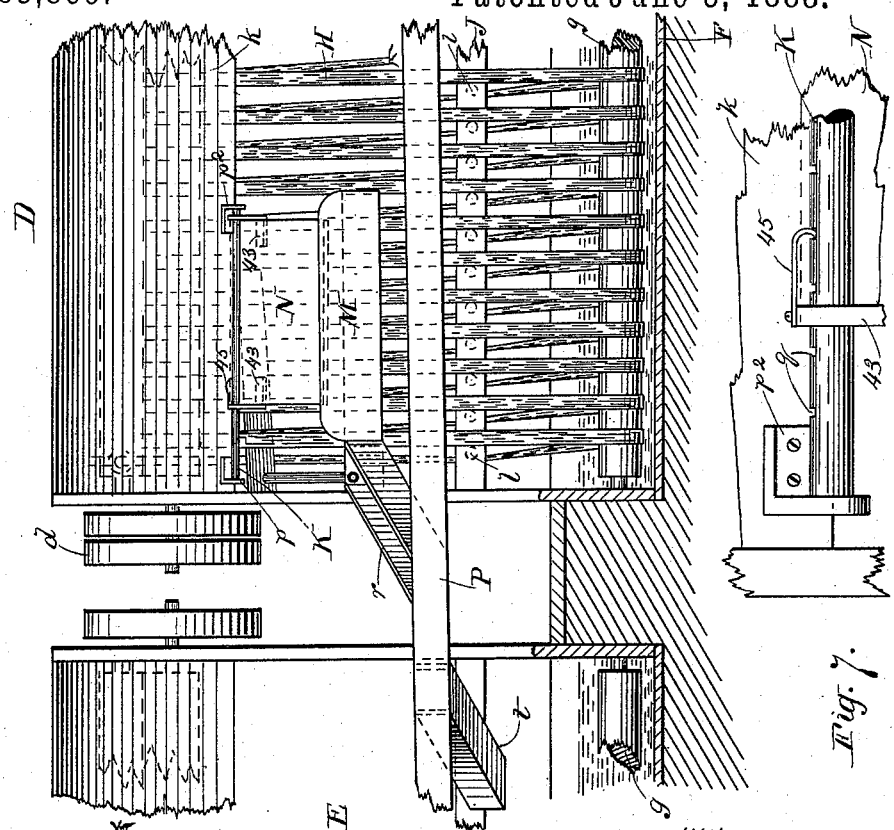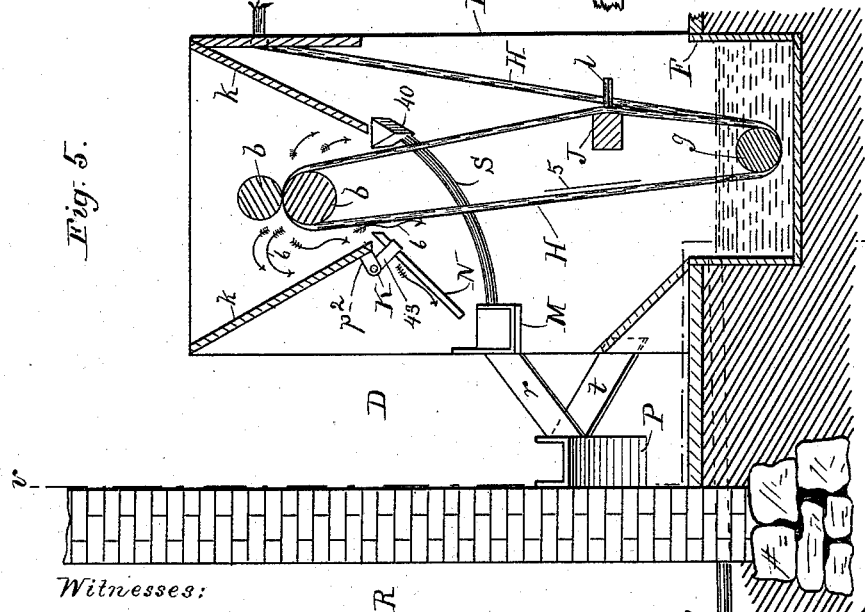

THOMAS DAVIES, OF PEABODY, MASSACHUSETTS.

APPARATUS FOR BLEACHING AND DYEING.

SPECIFICATION forming part of Letters Patent No. 383,869, dated June 5, 1888.

Application filed September 12, 1887. Serial No. 249,427. (No model.)

*To all whom it may concern:*

Be it known that I, THOMAS DAVIES, of Peabody, in the county of Essex, State of Massachusetts, have invented certain new and useful Improvements in Apparatus for Utilizing the Waste Water and Acid in Bleaching, of which the following is a description sufficiently full, clear, and exact to enable any person skilled in the art or science to which said invention appertains to make and use the same, reference being had to the accompanying drawings, forming a part of this specification, in which—

Figure 1 is a rear elevation of a series of washing-machines, such as are ordinarily used in bleaching cloth and provided with my improvement; Fig. 2, an end elevation looking from the right-hand end of Fig. 1; Fig. 3, a vertical transverse section taken on line $z\ z$ in Fig. 1; Fig. 4, a top plan view taken on the line $w\ w$ in Fig. 1; Fig. 5, an enlarged sectional view of a portion of the apparatus, as shown in Fig. 3; Fig. 6, a rear elevation taken on line $v\ v$ in Fig. 5, some of the parts being shown in vertical section; and Fig. 7, an enlarged view showing the method of adjusting the guide-board, the board and frame of the washer being represented as broken off.

Like letters and figures of reference indicate corresponding parts in the different figures of the drawings.

My invention relates to means for utilizing the acidulated water which is ordinarily allowed to run to waste while washing cloth during the process of bleaching; and it consists in a novel construction and arrangement of parts, as hereinafter more fully set forth and claimed, the object being to produce a simpler, cheaper, and more effective device for this purpose than is now in ordinary use.

The nature and operation of the improvement will be readily understood by all conversant with such matters from the following explanation.

In the drawings, A B C D represent portions of a series of washing-machines, such as are ordinarily used in a bleachery for removing the surplus acid or alkaline solutions from the cloth as it comes from the baths. Six of these machines are usually employed, the first two of which it is not deemed necessary to show to illustrate my improvement.

The washing-machine as ordinarily constructed consists of a frame-work, E, (see Figs. 3 and 5,) surmounting a tank, F, usually constructed in the ground for holding water. In the top of the frame E are journaled two longitudinally-arranged wringing-rolls, $b$, driven by pulleys $d$ and belts $a$, connected with a main driving-shaft, $f$, as shown in Fig. 1. Within the tank F is journaled a horizontally-arranged guide-roll, $g$. (See Fig. 5.) At the front of the frame E, and near one of its ends, there is a small box, G, (see Figs. 2 and 3,) in which are journaled two wringing-rolls, $h$, said rolls being driven by a crossed belt, $i$, from a pulley on the shaft of the lower roll $b$. In the front and rear upper corners, respectively, of the washer are disposed pendent inwardly-projecting "splash-boards" $k\ k$, (see Fig. 5,) their purpose being to direct the water back into the tank F as it is thrown from the cloth H when passing through the wringing-rolls $b$, as shown by arrows 6 in Fig. 5. A horizontally-arranged guide-bar, J, (see Figs. 5 and 6,) provided with pegs $l$, is disposed in the frame E above the tank F.

The cloth H is fed into one end of the washer between the wringing-rolls $b$ in the form of a rope, and is carried continuously down under the roll $g$ and up between said rolls $b$ in the tank F, (see Fig. 6,) the pegs $l$ of the guide-bar J serving to keep the different turns of cloth separated from each other. The cloth is then carried through an opening into the box G, (see Fig. 3,) through the wringing-rolls $h$, and up over a guide-roll, $m$, in the direction shown by the arrows 5 in Fig. 3, after which it is transported to another bath. Water is supplied to the tank F in each of the washers by means of a pipe, L, which enters the box G from the main water-supply, and each tank is provided with a waste or overflow pipe, $p$. (See Fig. 5.)

In the process of bleaching cloth it is first immersed in a "lime-boil" or alkaline bath, from which it is taken and washed in washer No. 1. (Not shown.) It is then placed in an acid bath, from which it is taken and washed in washer No. 2, (not shown,) to free it from the acid and dirt, after which it is immersed in a bleaching compound, and then washed in washer A. From washer A it is taken to an "ash boil" or bath, and afterward washed in washer B, from whence it is taken and placed in another bleaching compound or bath, after which it is washed in washer C. It is then immersed in another acid bath and washed again in machine D, from which it is taken to the drying-house. In this process the water in the tanks of the machines Nos. 1, 2, (not shown,) and A becomes rapidly dirty, and has to be constantly renewed, fresh water being ordinarily supplied to the tanks through the pipes L at the rate of about two hundred gallons per minute. The acid in the first acid bath also rapidly becomes weak and dirty, necessitating its frequent renewal. My improvement is designed to obviate these objections and difficulties, and to that end I make use of means which will be readily understood by all conversant with such matters from the following description.

A horizontally-arranged rod, K, (see Fig. 7,) is secured by means of brackets $p^2$ to the lower edge of the rear splash-board $k$ (see Fig. 5) in each of the washers B C D, and at the ends of said machine nearest the pulleys $d$. The rod K is provided on its upper edge with slots $q$. (See Fig. 7.) A guide-board, N, (see Figs. 5 and 6,) is supported in brackets 43, which are provided with inwardly-projecting hook-shaped arms 45, (see Fig. 7,) adapted to enter the slots $q$ in the rod K in such a manner that when said board is suspended from said rod, as described, it is nearly at right angles to the splash-board $k$, with its upper edge extending slightly inward beyond the lower edge of said board, as best shown in Fig. 5. A short collect trough or spout, M, (see Figs. 5 and 6,) is horizontally secured at the rear of the frame of the washer, directly under the lower edge of the board N. A main trough, P, (see Figs. 1 and 4,) is arranged horizontally at the rear of the washers, said trough being secured to the wall R of the building, or to any other suitable support. Branch troughs $r$ connect the troughs M of the washers B C D with the main trough P. The main trough is also supplied with discharge-spouts $t$, which lead into the tanks F of the washers 1 and 2 (not shown) and A B, said spouts being provided at their inner ends with hinged valves or gates 25, (see Fig. 4,) by which they can be closed.

An additional spout or tube, S, (see Fig. 5,) is secured at its lower end to the trough M, and extends upwardly across the interior of the washer, its upper end being provided with a flaring mouth or receiver, 40, which occupies the same relative position to the front splash-board $k$ as the trough M does to the rear splash-board.

In the use of my improvement the water, as it is thrown from the wringing-rolls $b$ of the washers B C D when the cloth H passes through them, strikes against the splash-boards $k$, and a portion of it falls from said splash-board, and is caught by the guide-board N and conducted into the trough M. From the troughs M the water runs through the branch troughs $r$ into the main trough P, and by opening or closing the gates 25 (see Fig. 4) it can be directed into the tank F of either of the washers 1 and 2 (not shown) or A and B, as desired. The cloth, after being taken from the last acid bath, is washed in washer D, as before described, the water in the tank F of said washer becoming rapidly acidulated. As the fresh water enters the tank from the supply-pipe L, the acidulated water is driven to the farther end of said tank. By regulating the guide-board N upon the slotted bar K, as described, water more or less permeated with acid may be caught and conveyed into the tank F of each of the washers 1 2 or A B, as desired.

The water in washer No. 1 ordinarily becomes dirty so rapidly that it is often necessary to stop the machine until fresh water can be supplied. This causes a great waste of water and by utilizing the water in machines B C D, which was formerly allowed to run to waste, a large saving is made, this being an item of great importance where filtered water is used. Moreover, the acid in the first acid-bath rapidly becomes exhausted, and ordinarily has to be renewed twice each week.

By using the waste acid in machine D much of the desired effect is obtained upon the cloth in the tanks F before as well as after it goes to the first acid bath, and a great saving of acid as thus effected.

As I propose to make the above-described process the subject-matter of another application for Letters Patent, I do not herein claim the same, broadly.

Having thus explained my invention, what I claim is—

1. The combination, in a bleaching apparatus, of a water-tank, a guide-roll therein, squeezing-rolls above the tank, a deflecting guide-board adjacent to said rolls for guiding the water therefrom, a collecting-trough for receiving the water from the guide-board, a secondary water-tank, a guide-roll therein, squeezing-rolls above said secondary tank, a deflecting guide-board adjacent to said rolls, a collecting-trough for receiving the water from said guide-board, a main trough provided with valved spouts leading into said tanks, and conduits connecting the troughs of the tank with the main trough, substantially as described.

2. In an apparatus of the character described, the frame-work E, having the splash-board $k$, in combination with the rod K, secured to said board and having the slots $q$, the guide-board N, provided with the brackets 43 and arms 45, trough M, spout $r$, and main trough P, substantially as set forth.

3. In a device of the character described, the main trough P, having the branch troughs *t r* and gates 25, in combination with the frame F, trough M, splash-board *k*, guide-board N, and means for adjustably attaching board N to the board *k*, substantially as described.

4. In a device of the character described, the trough M, provided with the tube *s*, having the mouth 40, in combination with the frame E, splash-board *k*, spout *r*, and main trough P, substantially as described.

THOMAS DAVIES.

Witnesses:
 HARRY COTCHIN,
 HENRY M. MEEK.